United States Patent Office 3,192,454
Patented June 29, 1965

3,192,454

SEMICONDUCTOR APPARATUS WITH CONCENTRIC PRESSURE CONTACT ELECTRODES

René Rosenheinrich, Ebermannstadt, and Helga Kursawe, Pretzfeld, Upper Franconia, Germany, assignors to Siemens-Schuckertwerke Aktiengesellschaft, Berlin-Siemensstadt, and Erlangen, Germany, a German corporation Filed Oct. 23, 1962, Ser. No. 232,393
Claims priority, application Germany, Oct. 24, 1961, S 76,393
6 Claims. (Cl. 317—234)

Our invention relates to encapsulated semiconductor apparatus wherein an essentially monocrystalline, disc-shaped semiconductor body possesses several distinc zones of different conductance, such as n-type or p-type conductance. In particular, the invention concerns semiconductor apparatus wherein one zone of the semiconductor body is provided with an annularly shaped alloy-bonded electrode in whose central opening a contact electrode for another zone is located.

An object of our invention is to provide an encapsulated semiconductor device of a construction significantly simplifying the assembly thereof. Another object is to provide such a device in which the current-conducting member for the inner or central contact electrode need simply be seated against the contact electrode without requiring further fastening.

According to a feature of our invention, we press a current-conducting member against the contact electrode within the central opening by biasing means such as a pressure spring. Moreover, we furnish, for holding the opposite end of the spring, an interior shoulder within a hollow conductor engaging the annular alloy electrode.

The hollow current-conducting member can be secured to the annularly shaped alloyed electrode by conventional means such as soldering, welding or alloying. According to a particularly suitable embodiment of the invention, this hollow current-conducting member is forced against its respective alloy electrode by a pressure storer or spring. This spring is braced by housing members.

The invention is applicable, for example, with transistors, four-layer p-n-p-n devices, photo-semiconductor devices or the like. For example, the annular alloy-bonded electrode constitutes the emitter connection for a terminal, and the contact electrode in the central opening of the annular electrode constitutes the base electrode of a transistor while the collector terminal is applied on the opposite side or at another location on the semiconductor body of the transistor.

The various features of novelty characterizing the invention are set forth in the claims forming a part of this specification. For a better understanding of the invention reference may be had to the following descriptive matter in which various embodiments of the invention are set forth in detail and by way of example, with reference to the accompanying drawing wherein:

Figures 1, 2, 3:
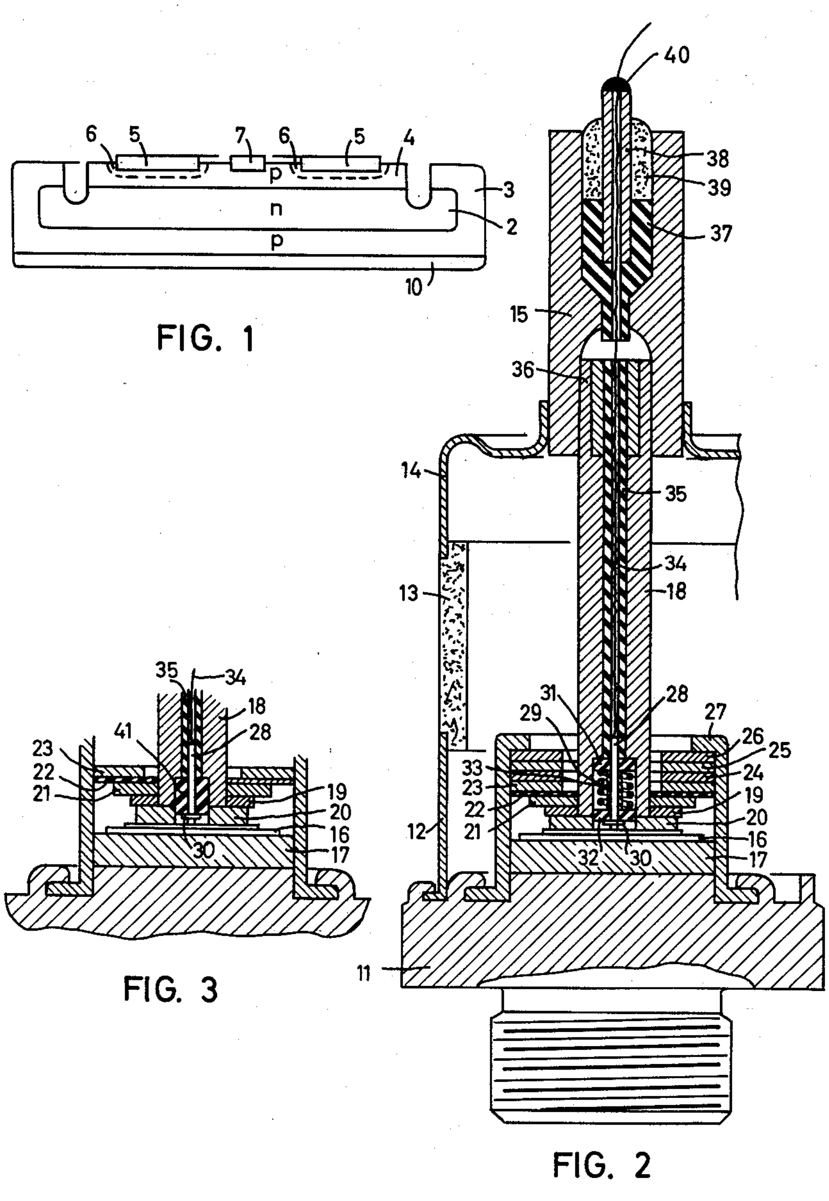
FIG. 1 is a schematic cross-sectional representation of a four layer semiconductor body which can be built into a housing and with which the principles of the invention are applicable.
FIG. 2 is a cross-sectional view of an assembled encapsulated semiconductor apparatus according to our invention.
FIG. 3 is a cross-sectional detail showing a portion of another encapsulated semiconductor apparatus embodying features of the invention.

The semiconductor device according to FIG. 1 can, for example, be manufactured in the following manner.

A semiconductor disc 2, consisting, for example, of monocrystalline n-type silicon and having a thickness of approximately 250 microns, is provided with a p-conducting upper surface layer 3 having a depth of approximately 60 microns. This is done by diffusing a p-doping substance such as aluminum into the silicon. For this purpose the disc 3 is heated to a temperature of approximately 1200° C. for 40 hours within an evacuated quartz vessel and in the presence of aluminum.

Upon the upper surface of the thus-prepared semiconductor disc, there is now etched a ring-shaped groove down to a depth larger than the thickness of the diffused p-conducting surface layer 3 so as to separate a circular disc-shaped surface layer 4. Thereafter, an annular gold foil containing approximately 5% antimony is alloyed onto the p-conducting layer 4. The gold foil, upon cooling, forms an annular electrode 5 and an adjacent antimony-doped zone 6 of n-type conductance. As a result, a p-n junction is formed which is shown in FIG. 1 with broken lines. A disc-shaped ignition electrode 7 in the central opening of the main electrode 5 is alloyed together with the silicon disc, the electrode 7 is formed, for example, of gold foil containing approximately .05% boron. The electrode 7 contacts the p-conducting layer 4 directly and forms an ohmic junction. The p-conducting layer 3 located upon the opposite surface of the semiconductor body is also directly (ohmically) contacted by alloying thereto an electrode 10 by the same or similar manufacturing means as described with reference to the ignition electrode 7. The electrodes 5, 7 and 10 prepared from gold foils of approximately 30 to 50 micron thickness can be alloyed simultaneously in the same process at 700° C. The two main electrodes 5 and 10 contact the outer layers 6 and 3 of the four-layer p-n-p-n junction device. The entire device may have a diameter of 18 mm.

The encapsulated semiconductor apparatus according to FIG. 2 comprises a base or support member 11 and a bell-shaped cover consisting of cylindrical parts 12 to 15. The base member 11 can be used as a heat sink and is preferably made of copper. Parts 12 and 14 preferably consist of a low-expansion iron-base alloy of the type available under the trademark Vacon or Kovar (28 to 30% Ni, 15 to 18% Co, remainder iron and a fractional percentage of manganese). The cylindrical member 13 consists of ceramic material and isolates the members 12 and 14 from each other. The ceramic is metallized at the locations at which it engages the parts 12 and 14, to permit soldering these parts together. The bell-shaped cover is secured to the base member 11 by flanging inwardly an upstanding ridge of the base member. The member 15 may also consist of copper and be secured to member 14 by soldering or welding.

The semiconductor device proper, denoted as a whole by 16 in FIG. 2 is secured upon a carrier plate 17 of molybdenum or tungsten. The device 16 may have a design corresponding to that of FIG. 1 and is preferably attached to the carrier plate 17 by alloying the electrode 10 to that plate. If necessary, one or more intermediate layers may be provided to simplify the alloying operation. For this purpose, the electrode 10 and/or the plate 17 may be coated such as by silver plating, for example. The carrier plate 17 is seated upon a raised platform of the base member 11. The underside of the carrier plate 17 is plated with noble metal, for example silver, or an intermediate layer of sliver foil approximately 100 microns thick is interposed between base member 11 and carrier plate 17.

Preferably the bonding between the base member 11 and the carrier plate 17 is accomplished according to the patent application of Reimer Emeis, Serial No. 220,336, filed August 29, 1962, assigned to the assignee of the present invention.

The surfaces resting upon one another are lapped prior to assembling. The lapping process is carried out so that the surfaces display a roughness depth of between .5 and 50 microns, preferably between 1 and 3 microns.

The term "roughness depth" is defined in the above copending application Serial No. 220,336 as follows.

The "roughness depth" is indicated by the distance between the bottom of a groove and the most outwardly protruding point or crest of an adjacent projection, and denotes the depth value averaged over the entire contact surface F in the assumption that the individual depth values do not essentially depart from each other on account of the uniformity of the roughness.

After lapping, each of the two contact surfaces is smooth to such a high degree that the two-sided divergence of the intermediate surfaces from a geometric plane is not greater than roughness depth. One of the two upper surfaces can be polished. However, care must be taken that the camber or arching of the outer surface which normally results from polishing does not result in too great a divergence of the intermediate surfaces from a geometric plane. At least one of the two outer surfaces must have the required roughness.

Upon the outer or contact surface of the semiconductor device 16 sits a hollow cylinder-shaped current-conducting member which is assembled from its several individual parts in such a manner as to contact the annular alloy electrode 5 along a broad surface. The current-conducting member comprises a tubular copper member 18, a copper ring 19 and an annular disc 20, for example of molybdenum. These members are secured to each other by hard soldering. The molybdenum disc 20 is also silver-plated upon the side facing the semi-conductor device. The above-mentioned requirements as to the area contact between the molybdenum disc 17 and the copper base 11 also apply to the contact engagement between the alloy-bonded contact electrode 5 and the molybdenum disc 20.

A steel washer 21, a mica disc 22 for insulating and centering purposes, another steel washer 23, and three plate or saucer springs 24, 25 and 26 form a stack on top of ring 19. A cup-shaped holding member 27 surrounds and sheaths the stack and has an upper inwardly turned flange to engage the periphery of the top of the stack, and force it downwardly. The bottom of the holding member 27 is peripherally secured to the base member 11 by means of an outwardly extending flange engaging an inwardly extending ridge on the base member. However, the base member and the holder member 27 may be joined together by other suitable means, for example by being screwed together or by welding. The same applies to the means of joining the base member with the member 12. Regardless of the particular fastening means employed, the cup-shaped member 27, secured to base member 11, has its upper flange act upon the springs 24, 25, 26 to apply a continuous contact pressure between the disc 20 and the electrode 5 of the semiconductor member 16, as well as between the carrier disc 17 and the base 11.

The current-conducting member comprised of parts 18, 19 and 20 is axially traversed by a bore which is enlarged at the bottom portion to form a shoulder. A current-conducting member 28, preferably a copper pin, is coaxially mounted in the bore and seated upon the contact electrode 7. Preferably the seating surface of pin 28 is also silver-plated, for example by galvanic silvering, and is made completely planar by lapping.

A helical spring 29 serves to press the pin 28 against the contact electrode 7. With its upper end the helical spring 29 presses against the inside of the first current-conducting member 18 at its interior shoulder, while the lower end of the helical spring 29 presses against a disc 30 rigidly secured to the pin 28. Disposed between the helical spring 29 and the shoulder is an insulating disc 31. Another insulating disc 32 is mounted between the spring 29 and the disc 30. The two insulating discs 31 and 32 may consist of polytetrafluorethylene (Teflon). A compressible insulating tube 33 surrounds the pin 28 and insulates it from the helical spring 29. A silver wire attached to the upper end of pin 28 extends through the axial bore of member 18 to the outside. An insulating tube 35, consisting, for example of silicone rubber, insulates the members 18 and 34 from each other. At the upper end of the member 18 its axial bore is widened, and a steel sleeve 36 is inserted to prevent the member 18 from being deformed by squeezing during fastening of the members 14, 15 to the member 18. Such squeezing might otherwise harm the insulation in the interior of member 18.

For assembling the encapsulated semiconductor apparatus the members 21 to 27 are preferably stacked about the pre-assembled current-conducting member comprised of parts 18, 19 and 20. Then the parts 28 to 36 are secured to the interior of the current-conducting member, and the entire assembly is placed upon the semiconductor device 16 previously placed upon the base member 11. Finally the member 27 is secured to the base member 11 thereby fastening the parts 19 to 36 in place. Thereafter the parts 12 to 15 forming the bell-shaped upper portion of the housing are sheathed over this assembly and secured to the base member 11 as described. Ultimately the members 15 and 18 are secured to each other by means of a press fit, or peripheral squeezing.

An insulator member 37 in the upper end of member 15 serves for insulation of the wire 34. This insulation preferably consists of polytetrafluoroethylene (Teflon). An elongated hollow cylindrical metal sleeve 38 consisting for example of silver, is coaxially seated in the insulating member 37. With the air of a liquid resin 39 the space between the member 15 and the hollow cylinder 38 is filled and thereby vacuum-sealed. A solder drop 40 finally serves to completely seal the interior space of the housing against the ambient air.

FIG. 3 illustrates another embodiment of the pressure mechanism of the current-conductor member 28. Instead of a helical spring 29, there is provided a plug 41 of silicone rubber or similar elastic material, which forces itself against the shoulder in the member 18 and at its lower end presses upon the disc 30 secured to the member 28. The current-conducting member 28 passes through a bore in plug 41 and insulation is thereby accomplished. The embodiment of FIG. 3 is otherwise identical with that of FIG. 2.

It will be obvious to those skilled in the art that the invention may be embodied otherwise without departing from the spirit and scope of the invention as set forth in the following claims.

We claim:

1. An encapsulated semiconductor apparatus comprising a housing, an essentially monocrystalline disc-shaped semiconductor body mounted in said housing having a plurality of zones of different conductance types, one of said zones being annular, an annular alloy electrode on said zone, a second zone centrally located within said first zone, a contact electrode on said second zone, a first current conducting member of hollow cylindrical shape having an annular end and an interior shoulder, resilient means engaging said housing for biasing the annular end against said annular electrode, a second current-conducting member passing through said first current-conducting member past said shoulder and against said contact electrode, and resilient means engaging said shoulder and said contact electrode for pressing said second current-conducting member axially against said contact electrode.

2. An encapsulated semiconductor apparatus comprising a housing, an essentially monocrystalline disc-shaped semiconductor body supported within said housing and having four layers of alternating semiconductance types, an annular electrode on one of said extreme layers, a contact electrode centrally located in said annular electrode and contacting an intermediate layer, said other extreme layer being connected to said housing, a first current-conducting member of hollow cylindrical shape having an annular end and an interior shoulder, resilient means engaging said housing and said annular end for biasing the end against said annular electrode, a second current-conducting member passing through said first current-conducting member past said shoulder and against said contact electrode, and resilient means engaging said shoulder and said contact electrode for pressing said second current-conducting member axially against said contact electrode.

3. A semiconductor apparatus as set forth in claim 1, wherein said last-mentioned resilient means includes a spring.

4. A semiconductor apparatus as set forth in claim 1, wherein said last-mentioned resilient means includes an elastic silicone rubber plug.

5. An encapsulated semiconductor apparatus comprising, a housing, a semiconductor body mounted within said housing, an annular electrode on said body, a contact electrode centrally located within said annular electrode and on said body, a first current conductor of hollow cylindrical shape having an annular end and an interior shoulder, resilient means engaging said housing and said annular end for biasing the end against said annular electrode, said first current conductor having terminal means extending through said housing, a second current conductor passing through said first current conductor and engaging said contact electrode, and resilient means engaging said interior shoulder and said second conductor for pressure biasing said second conductor toward said contact electrode.

6. An encapsulated semiconductor apparatus comprising, a housing, a semiconductor body mounted within said housing, an annular electrode on said body, a contact electrode centrally located within said annular electrode and on said body, a first current conductor of hollow cylindrical shape having an annular end and an interior shoulder, resilient means engaging said housing and said annular end for biasing the end against said annular electrode, said first current conductor having terminal means extending through said housing, a second current conductor passing through said first current conductor and engaging said contact electrode, and resilient means engaging said interior shoulder and said second conductor for pressure biasing said second conductor toward said contact electrode.

References Cited by the Examiner

UNITED STATES PATENTS

| | | | |
|---|---|---|---|
| 2,854,610 | 9/58 | Waters et al. | 317—235 |
| 2,861,226 | 11/58 | Lootens | 317—234 |
| 2,930,948 | 3/60 | Eannarino et al. | 317—234 |
| 2,956,214 | 10/60 | Herbst | 317—234 |
| 3,047,781 | 7/62 | Eannarino | 317—234 |

DAVID J. GALVIN, *Primary Examiner.*

JAMES D. KALLAM, *Examiner.*